June 10, 1924.  1,497,470
C. A. ANDERSON ET AL.
CHANGE SPEED GEAR
Filed Dec. 26, 1923  2 Sheets-Sheet 1
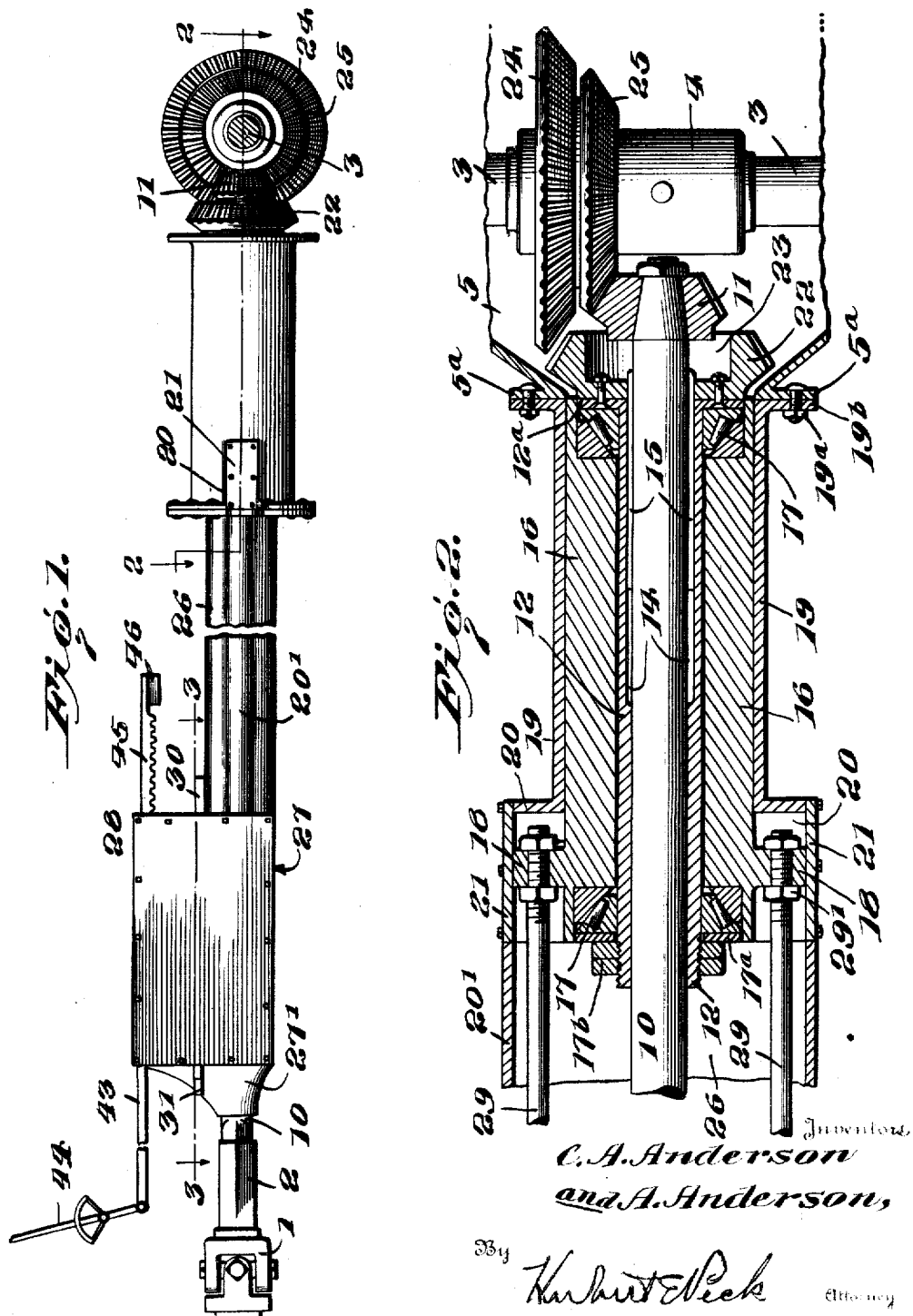

June 10, 1924.
C. A. ANDERSON ET AL
1,497,470
CHANGE SPEED GEAR
Filed Dec. 26, 1923      2 Sheets-Sheet 2
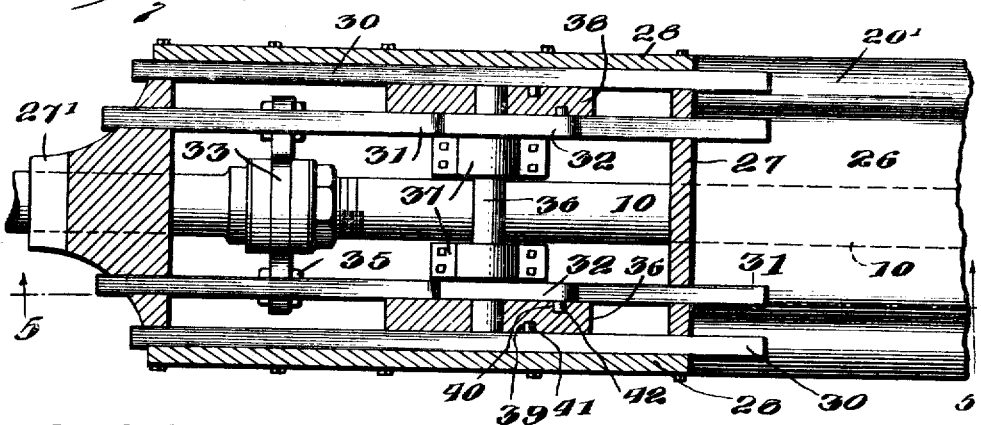
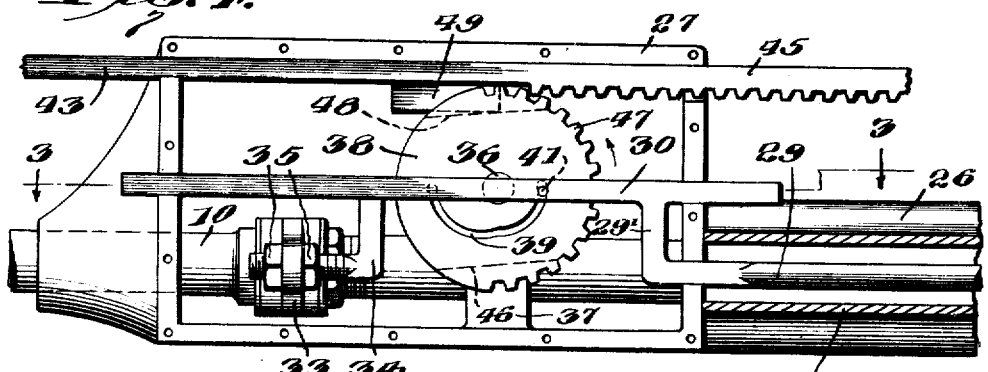
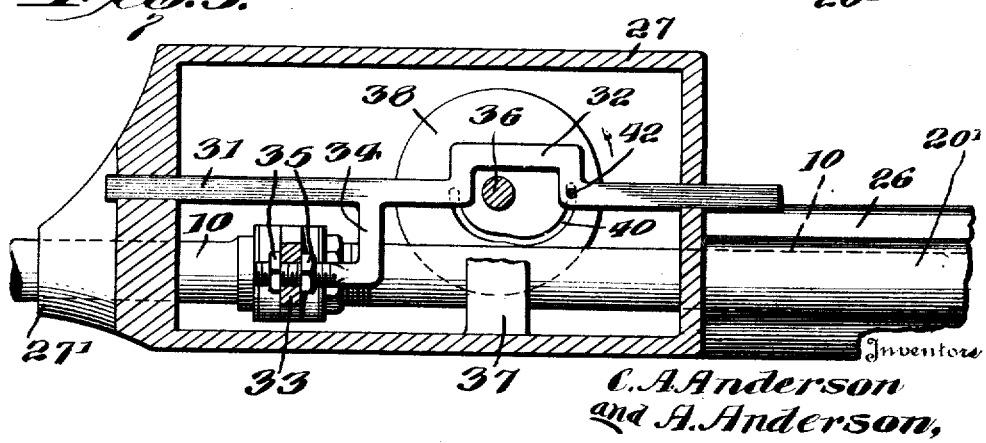
Inventors
C. A. Anderson
and A. Anderson,
By
Hubert Pick   Attorney Patented June 10, 1924.

1,497,470

UNITED STATES PATENT OFFICE.

CARL A. ANDERSON AND ALFRED ANDERSON, OF BOWMAN, NORTH DAKOTA.

CHANGE-SPEED GEAR.

Application filed December 26, 1923. Serial No. 682,797.

*To all whom it may concern:*

Be it known that we, CARL A. ANDERSON and ALFRED ANDERSON, both citizens of the United States of America, and residents of Bowman, county of Bowman, State of North Dakota, have invented certain new and useful Improvements In and Relating to Change-Speed Gears, of which the following is a specification.

This invention relates to certain improvements in change speed gearing; and the nature and objects of the invention will be readily recognized and understood by those skilled in the art in the light of the following explanation and detailed description of the accompanying drawings illustrating what we at present consider to be the preferred embodiments or mechanical expressions of the invention from among various other forms, embodiments, combinations and constructions of which the invention is capable within the spirit and scope thereof.

The invention is primarily directed to change speed gearing for motor vehicles of the internal combustion motor propelled types having a drive or propeller shaft operatively connecting the motor, through suitable intermediate operating connections, with the drive or traction wheels, although the invention is not limited or restricted to the foregoing application and use thereof, as it is equally adapted to application and use with various other power transmitting means where equivalent or similar conditions may be encountered and the results and advantages of the various features of the invention desired, as will readily appear to those skilled in this art from the following explanation of the principles and various features which the invention embodies.

In motor vehicles of the type in which the power from the motor is transmitted to the drive or traction wheels through propeller shafting driving a pinion operatively engaging a bevel gear coupled to the wheel axles, suitable change speed gearing is generally interposed at some suitable point intermediate the motor and driven axles in operative relation with the propeller shafting, through the medium of which the speed ratio between the motor and the drive or traction wheels can be varied, that is the motor can be operated at a higher speed in proportion to the speed of the driven axles and traction wheels operated thereby. With this change speed gearing in position to permit of the drive or traction wheels being driven at highest speed by the motor, a substantially direct drive connection is obtained from the motor through the propeller shafting and bevel gear and pinion to the wheel axles driven thereby, so that the speed of the axles and driving wheels approaches the speed of the motor and the motor is operated at a lower speed with a resulting higher speed of the wheels due to the practically direct driving connection.

In the operation of the foregoing types of motor vehicle power transmission mechanism, it is frequently found necessary, due to road and the like conditions, to drive the vehicle through a position of the change speed gearing which will increase the speed ratio between motor and wheels, that is a greater speed of operation for the motor with a lower speed developed by the drive wheels, and resulting greater driving power for the wheels. However, with the average variations in road conditions the power derived by the operation of the change speed gearing to increase the speed ratio between motor and wheels is greater than actually required for a vehicle, and further it necessitates elimination of the direct drive from motor to wheels and requires the operation of the motor at high speed with resulting increased consumption of fuel and oil, and increase in wear and tear upon a motor.

Therefore, one of the primary and fundamental purposes and objects of the invention is the provision of change speed gearing for the foregoing type of motor vehicle power transmission, in which the direct drive connection from motor to wheels is maintained but with which it is possible to vary the speed ratio between the propeller or drive shafting and the drive wheels over a range sufficient to meet the average requirements of variations in road and the like conditions encountered in use, and thus permit of operation of the motor at lower speeds with the resulting material decrease in fuel and oil consumption and in wear on a motor.

A further object of the invention is the provision of change speed gearing for motor vehicles of the drive or propeller shaft type, which permits of a direct drive being maintained between motor and drive wheels during all positions of the gearing, and in which the gears are so mounted and arranged that only those gears in operation for each speed are in mesh or operative engagement.

A further object of the invention is the provision of such type of change speed gearing which is of simple construction and compact assembly capable of being readily mounted and housed on and in connection with the types of power transmission in general use for motor vehicles.

A further object of the invention is to provide simple and efficient gear shifting mechanism for use with change speed gearing embodying the principles and features of the invention.

With the foregoing general objects as well as various other objects and results in view, which other objects and results will be readily recognized and understood by those familiar with the art from the following description, the invention consists in certain novel features in construction and in combinations and arrangements of elements, as will be more fully and particularly referred to and specified hereinafter.

Referring to the accompanying drawings:

Fig. 1, is a side elevation of the gear shift and propeller shaft assembly and housing, showing the change speed gearing in operative relation on and connecting the propeller shaft and driven axles.

Fig. 2, is a longitudinal horizontal section through the change speed gearing taken on the line 2—2 of Fig. 1, a portion only of the driven axles and propeller shaft being shown.

Fig. 3, is a view in horizontal section through the gear shifting mechanism of the invention and casing therefor taken on the line 3—3 of Fig. 4, and showing a portion of the propeller shaft casing.

Fig. 4, is a side elevation of the gear shifting mechanism with a side plate of the casing thereof removed.

Fig. 5, is a vertical section taken on the line 5—5 of Fig. 3.

In the embodiment of change speed gearing disclosed in Figs. 1 and 2 of the accompanying drawings by way of example of a possible mechanical expression of the principles and features of the invention, the general assembly of the propeller shafting and casing therefor from the motor to the driven axles, the gear shifting mechanism and casing therefor, and the change speed gearing operatively connecting the rear end of the propeller shaft with the driven axles, is illustrated in Fig. 1 of the drawings. A universal joint or connection 1 of the usual or any other desired type, referring now to Fig. 1 of the drawings, is connected at the forward side thereof by any suitable means to a motor (not shown) and at the rear side is coupled to the propeller shaft 10 by means of a loose, sliding or slip joint 2 to permit of longitudinal movement or play of the shaft 10, in the usual or any other desired manner well understood in this art. The propeller shaft 10 extends rearwardly and longitudinally of a vehicle (not shown) from the motor thereof in the usual manner, to the rear end of the vehicle where it is operatively connected to and drives the rear or driven axles 3, through the change speed gearing of the invention and the usual differential gearing 4 (diagrammatically shown in Fig. 2), as will be explained and described in detail hereinafter.

Referring particularly to Fig. 2 of the accompanying drawings, the differential gearing 4, change speed gearing of the invention, and inner ends of the axles 3 are mounted within the usual or any other desired housing or casing 5 at the forward side thereof formed with an opening having the outwardly extending flange 5ª therearound. The rear end of the propeller shaft 10 extends through the opening in the housing 5 and terminates therewithin a distance forwardly of the differential 4 and driven axles 3, in the usual manner, and is tapered to receive the pinion 11 which is fixed and secured thereon to rotate with the propeller shaft 10. A tubular shaft or sleeve 12 is slidably mounted on and over the rear end length of the propeller shaft 10 and extends a distance forwardly thereon from the housing 5. The sleeve 12 is formed with the interior longitudinally disposed grooves 14 extending from the rear end of the sleeve forwardly a distance thereinto, and the shaft 10 is provided with the keys or splines 15 slidably fitting into and engaging the grooves 14. The keys 15 can be formed separately from or integral with the propeller shaft 10, as may be desired, and are considerably less in length than the grooves of the sleeve 12, so that the sleeve is fixed to rotate with the shaft 10 but is movable a distance longitudinally, forwardly and rearwardly, thereof and thereon, as will be clear by reference to Fig. 2.

The rear end of the sleeve shaft 12 terminates a distance inwardly from the end of the shaft 10 and the pinion 11 thereon, and is provided with an outwardly extending radial flange 12ª of smaller diameter than that of the opening through the housing 5. A bearing sleeve 16 is loosely mounted over and surrounding the sleeve shaft 12 and is provided at the opposite ends thereof with any desired or suitable anti-friction bearings, such as the roller bearings 17, diagrammatically shown in the Fig. 2 of the drawings. The bearings are mounted in suitable recesses formed in the ends of the sleeve 16, and the rear end bearing is confined in position by the flange 12ª of the sleeve shaft 12, while the forward end bearing is confined in position by an end plate 17ᵃ interposed between the bearing and a pair of lock and adjusting nuts 17ᵇ threaded onto the forward end of the sleeve shaft 12 and bearing against the end plate 17ᵃ. Thus, the sleeve shaft 12 slidably mounted on the propeller shaft 10, extends through the bearing sleeve 12 and is rotatably mounted and supported in the forward and rear bearings 17 thereof. The bearing sleeve 16 is fixed to the sleeve shaft 12 through the flange 12ᵃ at the rear end and the locking nuts 17ᵇ at the forward end thereof, so that the sleeve shaft and bearing sleeve are movable longitudinally of the propeller shaft 10, while the sleeve shaft and propeller shaft are rotatable in the bearing sleeve by the mounting of the sleeve shaft 12 in the bearings 17. The forward end of the bearing sleeve 16 is formed with the horizontally disposed opposite side ears or lugs 18 having suitable bores therethrough for receiving actuating members, as will be described hereinafter.

A casing 19 extends over and around the bearing sleeve 16 and is secured at the rear end to the flange 5ᵃ of the housing 5 by means of bolts, rivets, or the like 19ᵃ and the end flange 19ᵇ, so that the casing 19 forms a forward continuation of the housing 5 from and around the forward opening through the housing 5. The forward end of the housing 19 is formed with opposite side lateral enlargements 20 providing guideways to receive the opposite side lateral ears or lugs 18 on the forward end of the bearing sleeve 16. and these enlargements 20 are provided with removable plates 21 closing the outer sides thereof to permit of access to the interior of the casing and the ears or lugs 18.

A bevel gear 22 is mounted on the rear end of the sleeve shaft 12 for rotation thereby, by bolting or otherwise securing the same on and to the end flange 12ᵃ. The bevel gear 22 is of larger diameter than the pinion 11 on the end of the propeller shaft 10, and is formed with a central bore or recess 23 of a diameter to permit of entry of the pinion 11 thereinto. The bevel gear 22 is located within the housing 5 between the pinion 11 and the end of the sleeve shaft 12, so that this gear is disposed forwardly of the pinion 11 and axially alined therewith in the housing 5. A set of bevel gears 24 and 25 are mounted on and in operative relation with the wheel axles 3 and the differential 4 within the housing 5, in the usual manner well understood in this art, so that rotation of either of the gears 24 and 25 will drive the axles 3 through the differential 4. The gear 24 is the larger and is mounted in line with the bevel gear 22, for mesh and engagement therewith when the gear 22 is moved rearwardly by movement of the sleeve shaft 12 on the propeller shaft 10; and the gear 25 which is smaller than the gear 24 is mounted inwardly a distance on the axle assembly from gear 24, and is alined with the pinion 11 for engagement and mesh therewith when the propeller shaft 10 is moved rearwardly to the position as shown in Fig. 2. The pinion 11 and gear 25 when engaged form the low speed drive for the axles, and the gears 22 and 24 when engaged form the high speed drive, the two sets of engaging gears being operated to be alternately in engagement, as will be explained hereinafter with reference to the actuating or shifting mechanism for the gear 22 and pinion 11.

The casing 19 is reduced in size and formed to provide a section 26 extending forwardly from the casing 19, over and enclosing the propeller shaft 10. The casing section 26 is likewise formed with the opposite side lateral enlargements 20′ extending longitudinally thereof in forward continuation of the enlargements 20 of casing 19. The casing section 26 extends forwardly to and opens into a boxing 27 forming a housing for the operating or shifting mechanism for the gears 11—25 and 22—24, as will be explained. The propeller shaft 10 extends through the boxing 27 from casing section 19 to the slip joint 2 and universal joint 1, and is journaled in and extends through a suitable bearing 27′ at the forward end of the boxing 27. The opposite sides of the boxing 27 are formed by removable plates 28 to permit of ready access to the interior of the boxing.

The mechanism for shifting the gears 11—25 and 22—24 to vary or change the speed of the axles 3, is mounted and housed within the boxing 27. A pair of actuating rods 29 are adjustably coupled at their rear ends to the opposite lateral lugs or ears 18 at the forward end of the bearing sleeve 16 by means of nuts or the like 29′ the ends of the rods 29 being screw threaded and extended through suitable bores in the lugs or ears 18. The rods 29 are extended forwardly through and disposed in the guideways formed by the lateral enlargements of casing section 26, to and extend through and are slidably mounted in the rear wall of the boxing 27 (see Fig. 4 particularly). Opposite slide rods 30 are mounted extending through the boxing 27 with their opposite ends extended through the forward and rear walls thereof, above the ends of the actuating rods 29, and are connected to the ends of the rods 29 by the connecting links 29′ respectively, which extend upwardly from the ends of rods 29 within the boxing 27. Thus, by sliding the rods 30 forwardly and rearwardly through the boxing 27, the rods 29 are actuated to move the bearing sleeve 16 and sleeve shaft 12 forwardly and rearwardly to disengage and engage the gear 22 with the gear 24.

A second set of slide rods 31 are mounted extending forwardly and rearwardly through the boxing 27, spaced a distance inwardly from the slide rods 30, respectively, and slidably mounted in the forward and rear walls of the boxing 27. The slide rods 31 are each formed with upwardly disposed lengths 32 for a purpose appearing hereinafter. At the forward portion of the propeller shaft 10 within the boxing 27 a cross head 33 is adjustably mounted and fixed thereon, and the opposite ends of the cross head 33 are connected to the slide rods 31, respectively, by the arms 34 depending from the rods 31 and extended forwardly to the ends of the cross head 33, where they are adjustably fixed thereto by the nuts 35, in the usual or any other suitable manner. By the foregoing mounting and arrangement, the slide rods 31 can be actuated to move the propeller shaft 10 forwardly and rearwardly, through cross head 33, to disengage and engage the pinion 11 on the rear end thereof with the bevel gear 25 on the rear axles 3, the slip or sliding connection 2 of the propeller shaft permitting longitudinal movement thereof.

The sets of slide rods 30 and 31 for shifting the gears 22 and 11, respectively, are operatively coupled with actuating mechanism so arranged that alternate movements forwardly and rearwardly are imparted thereby to the gears 24 and 11, that is when pinion 11 is moved rearwardly into engagement with gear 25, gear 22 is moved forwardly out of engagement with gear 24, and vice versa, as will be clear by reference to the drawings in connection with the foregoing description. In the present example, such mechanism embodies a shaft 36 mounted transversely of the boxing 27 on standards 37 extending upwardly from the bottom wall of the boxing, with the shaft in the plane of the slide rods 30 and extending through and cleared by the upwardly extending or arched portions 32 of the slide rods 31. The shaft 36 terminates at the opposite ends thereof at the inner sides of the rods 30, respectively, and the cam wheels 38 are mounted on the ends thereof for rotation therewith. Each wheel 38 is provided with a cam groove 39 on the outer face thereof, and a cam groove 40 on the inner face thereof. The slide rods 30 are each provided with a pin 41 extending laterally from the inner face thereof and extending into and engaged by the cam groove 39 of the adjacent cam wheel 38, respectively. Each slide rod 31 is provided with a pin 42 extending laterally from the outer face thereof and extending into and engaged by the cam groove 40 on the inner face of the cam wheel 38, respectively adjacent thereto. The outer and inner cam grooves 39 and 40 of each cam wheel 38 are respectively similar and are so disposed on and extending around the wheel with respect to the axis of rotation thereof, that when a cam wheel is rotated in a forward direction the inner cam groove 40 forces the pin 42 inwardly toward the axis of the wheel which in turn forces the slide rod 31 forwardly, while the outer cam groove 39 forces the pin 41 outwardly from the axis of the wheel which forces the slide rod 30 rearwardly in the reverse direction from the movement of rod 31. When the cam wheel is rotated in a rearward direction the reverse movements of the slide rods 30 and 31 associated therewith take place, that is rod 31 is moved rearwardly and rod 30 is moved forwardly. The foregoing actions take place simultaneously upon rotation of the pair of cam wheels 38 and each pair of rods 30 and 31, respectively, or moved in reverse directions, as will be readily apparent. The cam grooves are further so curved and of such a shape, that upon rotation of the wheels, the rods are not operated at the start of the movement of the grooves, but a portion of a revolution of the wheels is made before the grooves cause the forward or rearward movements of the slide rods.

An operating rod 43 is provided extending through the boxing 27 above and alined with the periphery of one of the cam wheels 38, and extends forwardly to and is operatively connected with any suitable or desired manual actuating lever 44 (see Fig. 1 of the drawings), which is mounted at any suitable point upon the vehicle (not shown) for actuation by the operator of the vehicle. The operating rod is slidably mounted through the end walls of the boxing 27 and the rear portion thereof is formed as a rack 45 having a stop 46 at the rear end thereof for engaging the boxing and limiting forward movement of the rod 43. A portion 47 of the periphery of the cam wheel 38 above which the rack bar 45 is mounted, is toothed and meshes with the rack 45, as clearly shown in Fig. 4 of the accompanying drawings. Thus, by forward and rearward movements of the operating rod 43, the cam wheels 38 and shaft 36 are rotated forwardly and rearwardly by the rack 45 in mesh with the toothed portion 47 of one of the cam wheels 38. The toothed cam wheel 38 is provided on the inner side thereof with the parallel, spaced inwardly disposed flat surfaces 48 extending chordwise of the cam wheel, and the rod 43 is provided with an inwardly offset depending block 49 presenting a flat lower face for cooperation with the surfaces 48 of the toothed cam wheel 38. The block 49 and wheel surfaces 48 are so arranged and positioned with respect to each other, that when the cam wheel is rotated forwardly to the limit of the rod pins 41 and 42 in the cam grooves of the wheel the block 49 engages one of the wheel faces 48 and locks the wheel 38 against further forward rotation and renders the rod 43 inoperative with relation thereto, and when the wheel is rotated rearwardly to the limit of the cam grooves and pins, the other wheel surface 48 engages the block 49 and renders the wheel inoperative for further rearward rotation by the operating rod 43.

In the operation of the change speed gearing and shifting mechanism as hereinbefore described and disclosed in the accompanying drawings, the actuating lever 44 is thrown forwardly to move the operating lever 43 to rearward position and cause the pinion 11 to be moved rearwardly into mesh with the inner bevel gear 25 on the rear axles 3 and the bevel gear 22 to be moved forwardly out of mesh with the outer bevel gear 24 on the axles 3. This is the low gear or low speed position of the change speed gearing and is clearly shown and indicated in Figs. 1 and 2 of the drawings, while the shifting mechanism within the boxing 27 for this position of the change speed gearing is shown in Figs. 3, 4 and 5. With the change speed gearing in low speed position the propeller shaft 10 drives the axles 3 through the differential 4 and the engaged pinion 11 and bevel gear 25, and the gear 22 is out of mesh with gear 24 and rotates idly through the rotation of the sleeve shaft 12 by the propeller shaft 10 on which it is keyed.

In order to shift the change speed gearing to high speed position, gears 22 and 24 meshed and gears 11 and 25 disengaged, the lever 44 is operated to move the rod 43 forwardly which rotates the cam wheels 38 forwardly through the rack 45 and toothed portion 47 of one of the wheels 38. Forward rotation of the cam wheels 38 causes the outer cam grooves 39 thereof to force the slide rods 30 rearwardly, through the pins 41 engaged therein, and the rearward movement of rods 30 forces the rods 29 with which they are connected rearwardly, and these rods in turn move the bearing sleeve 16 and the sleeve shaft 12 carrying bevel gear 22 rearwardly over the propeller shaft 10 to position with gear 22 engaged with bevel gear 24. Simultaneously with the rearward movement of the bevel gear 22, the rods 31 are forced forwardly by the inner cam grooves 40, through the pins 42 engaged therewith, and the propeller shaft is moved forwardly by the rods 31, through the cross head 33 fixed on the shaft 10 and connected with the rods 31 by the arms 34. This forward movement of the propeller shaft 10 is possible through the slip or sliding joint connection 2 at the forward end thereof, and the sliding mounting of the shaft 10 in and extending through and keyed with the sleeve shaft 12. As the propeller shaft 10 moves forwardly the pinion 11 on the rear end thereof is withdrawn from engagement with the low speed gear 25, and the gear 22 on the sleeve shaft 12 is simultaneously moving rearwardly into engagement with the high speed gear 24, so that the pinion 11 moves into the recess or bore 23 of the bevel gear 22, the pinion and gear 22 in effect telescoping, as will be readily apparent by reference particularly to Fig. 2 of the accompanying drawings. The operation of the shifting mechanism and change speed gearing, the shift from high speed position to the low speed position as shown in Fig. 2, is the reverse of the above described operations, as hereinbefore explained. It will be noted that the gears 11 and 22 are alternately engaged with the gears 25 and 24, respectively, that is when gears 11 and 25 are in mesh and operating, gears 22 and 24 are out of engagement, inoperative and idling.

The cam grooves 39 and 40 on each wheel 38, are so curved and disposed with respect to the axis of the wheel, that in shifting from one speed to another there is a considerable movement or play of lever 44 and wheels 38 before the actuation of the slide rods 30 and 31 commences, thus insuring positive, complete movements of the shifting mechanism from one position to another, and preventing actuation of the change speed gearing through small accidental movements of the shifting lever. The arrangement of the block 49 on the rod 43 for cooperation and engagement with the surfaces 48 of the cam wheels in the operative positions of the change speed gears, prevents over control and in effect locks the shifting mechanism in the operative positions thereof so as to require a positive full movement of the shifting lever 44 to change the gear positions.

With the foregoing described change speed gearing mounted on and embodied in a conventional type of motor vehicle including the usual type of change speed transmission or gearing interposed in the propeller shafting between the motor and the driving connection with the differential and rear axles, the change speed transmission is positioned in the high speed relation thereof giving a direct drive connection from the motor to the rear axles for operation of the motor at low speed, and the change speed gearing of the invention is actuated to an operative position in driving relation between the propeller shaft and the rear axles and traction wheels driven thereby. Under the normal road and the like operating conditions encountered by the vehicle the change speed gearing may be operated in high speed position with propeller shaft gear 22 in mesh with and driving axle gear 24, so that the motor is operated at a low speed and resulting relatively high speed of the driven rear axles. Now, with the average change in road conditions requiring an increase in driving power, instead of changing the usual transmission to secure higher speed from the motor and lower speed from the driving or traction wheels and resulting elimination of the direct driving connection, the change speed gearing of the invention is shifted to low speed position with the propeller shaft pinion in mesh with and driving the rear axles through the gear 25 while maintaining the direct drive connection from the motor. In this manner the invention permits of operating a vehicle with a direct drive and low motor speed under the average normal changes in road and the like operating conditions, with the resulting low fuel and oil consumption and minimum wear on a motor.

While in the specific embodiment of the invention illustrated as an example herewith, two sets of gearing to give two speeds are shown, it will be clear that more than two speeds can be employed by the use of additional gear sets in accordance with the principles of the invention, and the invention includes and contemplates the use of more than two speeds where conditions of operation make it desirable. Further, attention is directed to the fact that certain principles and features of the invention are applicable to and adapted for use with the transmission of power from a driving shaft to a driven shaft generally, where similar or equivalent conditions to those of the illustrated application may be encountered.

It is also evident that various changes, variations, substitutions and modifications might be resorted to without departing from the spirit and scope of the invention, and hence I do not desire to limit our invention to the exact disclosures hereof.

Desiring to protect our invention in the broadest manner legally possible, what we claim is:

1. In change speed gearing for motor vehicles, in combination with a vehicle propeller shaft and driving axles, a high speed gear and a low speed gear on the driving axles, a pinion on the propeller shaft for engagement with the low speed gear, a gear on and movable longitudinally of the shaft for engagement with the high speed gear said shaft gear formed with an axial recess therein, and means for moving said pinion and shaft gear to and from engagement with said low and high speed gears, respectively, the said shaft gear out of engagement with the high gear when the pinion is in engagement with the low gear and the pinion out of engagement and received in said shaft gear recess when the shaft gear is in engagement with the high speed gear.

2. In change speed gearing for motor vehicles, the combination with a longitudinally movable vehicle propeller shaft, and driving axles, of a pair of gears on said axles, a pinion mounted on the end of said propeller shaft for movement to and from engagement with one of said axle gears, a gear having an axial recess mounted on the propeller shaft for movement longitudinally thereof to and from engagement with the other of said axle gears, and means for simultaneously moving said propeller shaft and pinion and said shaft gear longitudinally in opposite directions, whereby with the pinion in engagement the shaft gear is out of engagement, and with the shaft gear in engagement the pinion is received in the axial recess of said gear and out of engagement, with the respective axle gears.

3. In change speed gearing for motor vehicles, the combination with a longitudinally movable vehicle propeller shaft, and vehicle driving axles, of a high speed gear and a low speed gear mounted in axial alinement on the vehicle axles for driving the same, a low speed gear mounted on and movable longitudinally with the shaft to and from engagement with the axle low speed gear, a high speed gear mounted on, axially alined with and driven by the propeller shaft, said shaft high gear formed with an axial recess therein concentric with and movable longitudinally of the shaft to and from engagement with the axle high speed gear, and means for simultaneously moving the shaft with the low speed gear and the high speed gear in opposite directions longitudinally of the shaft whereby with the high speed gears engaged the low speed gears are disengaged with the shaft low gear received within the recess of the shaft high gear, and with the low speed gears engaged the high speed gears are disengaged.

4. In change speed gearing for motor vehicles, the combination with a longitudinally movable vehicle propeller shaft, and vehicle driving axles, of a high speed gear and a low speed gear in axial alinement on the driving axles, a low speed gear on the end of and movable with the propeller shaft to and from engagement with the axle low gear, a high speed gear mounted on the propeller shaft forwardly of the low speed gear and movable longitudinally on the shaft to and from engagement with the axle high speed gear, said shaft high speed gear formed with a central bore adapted to receive and telescope with the shaft low gear, and means for simultaneously moving said shaft and low speed gear thereon forwardly out of engagement with the axle low speed gear and said high speed gear rearwardly into engagement with the axle high speed with the shaft low speed gear extending into and telescoped with the shaft high speed gear, or simultaneously moving the shaft gears in the reverse directions to engage the low speed gear and disengage the high speed gear.

5. In combination, a driving shaft longitudinally movable, a driven shaft disposed transversely of and spaced from the driven shaft in the plane of the axis thereof, a pinion mounted on the end of the driving shaft and movable longitudinally therewith, a sleeve slidably mounted on the driving shaft and keyed for rotation therewith, a gear mounted on said sleeve inwardly from and of larger diameter than said pinion, said gear formed with a recess adapted to receive said pinion in telescoping relation with the gear, a pair of gears mounted on the driven shaft in position thereon for engagement by said gear and pinion of the driving shaft, respectively, and means for simultaneously moving said shaft pinion into engagement with one of the driven axle gears and said sleeve carried gear out of engagement with the other of said driven axle gears, or for moving the shaft pinion out of engagement and the sleeve gear into engagement, with the pinion telescoped with and received in the recess of the sleeve gear.

6. In change speed gearing for motor vehicles, the combination with a longitudinally movable vehicle propeller shaft, and vehicle axles driven therefrom, of a pair of gears on said axles, a pinion on the end of said propeller shaft for movement therewith to and from engagement with one of said axle gears, a sleeve slidably mounted on said shaft and keyed thereto for rotation therewith, a gear on said sleeve axially alined with the shaft and forwardly of said pinion, for movement to and from engagement with the other of said axle gears, a bearing sleeve mounted over said shaft and gear sleeve with the latter fixed thereto for rotation therein, and means connected with said propeller shaft and bearing sleeve for simultaneously moving the shaft and gear sleeve in opposite directions.

7. In change speed gearing, the combination with a longitudinally movable driving shaft, and a driven shaft disposed transversely thereof, of a pair of gears on the driven shaft, a pair of telescoping gears mounted on and axially alined with the driving shaft for selective engagement with said driven shaft gears, respectively, one of said shaft gears fixed on and movable longitudinally with said driving shaft and the other of said telescoping shaft gears movable independently and longitudinally of the driving shaft and means for simultaneously moving said telescoping shaft gears in opposite directions, said driving shaft gears in one operative position in telescoped relation.

8. In change speed gearing for motor vehicles, the combination with a longitudinally movable vehicle propeller shaft, and vehicle axles, differential gear and a housing therefor, of a pair of gears on said axles, a pinion fixed on said propeller shaft for movement to and from engagement with one of said axle gears, a gear mounted on and concentric with said propeller shaft for rotation thereby, said gear movable independently and longitudinally of the propeller shaft for movement to and from engagement with the other of said axle gears, bearing means for said shaft gear, actuating rods operatively coupled with said gear bearing means and gear, a housing for said propeller shaft forming a substantial continuation of said axle and gear housing, said actuating rods mounted in said shaft housing for reciprocation therein to move said gear longitudinally of the shaft, and means operatively connected with said actuating rod and with the propeller shaft for simultaneously moving said pinion and said gear to and from engagement with said axle gears, respectively.

9. Mechanism for simultaneously moving concentric rotatable shafts in opposite directions, embodying an operating lever, cam wheels rotated thereby, actuating rods operatively connecting said cam wheels with each of said concentric shafts, respectively, said cam wheels formed with cam grooves on opposite faces thereof, pins on said actuating rods engaged in said cam grooves, respectively, and said cam grooves so arranged and formed that upon rotation of said wheels in one direction the actuating rods for one of the shafts are moved in a direction opposite to the movement of the operating rods for the other of the shafts.

10. In mechanism for simultaneously moving concentric rotatable shafts in opposite directions, an actuating rod connected with one shaft, an actuating rod connected with the other shaft, a cam wheel rotatably mounted on an axis disposed transversely to the common axis of the shafts, said actuating rods extending to opposite sides of said cam wheel and engaged by cam grooves on opposite sides, respectively, of the wheel, said grooves formed and arranged to move said actuating rods and shafts in opposite directions upon rotation of the cam wheel, and means for rotating said cam wheel.

11. In change speed gearing including concentric rotatable shafts having gears thereon and movable longitudinally in opposite directions: mechanism for simultaneously moving said shafts and gears in opposite directions, embodying actuating rods operatively coupled to each shaft, a shaft disposed transversely of said concentric shaft, cam members rotated by said shaft, members on said actuating rods engaged by said cam members, respectively, said cam members so mounted and arranged that upon rotation thereof the actuating rods for each of said concentric shafts are simultaneously moved in opposite directions thereby, respectively, and means for rotating said cam members.

12. In change speed gearing for motor vehicles, the combination with the vehicle propeller shaft and driving axles, of a pair of gears on the driving axles, and a pair of gears mounted on and movable axially of the propeller shaft for selective engagement with said axle gears, respectively, one of said shaft gears formed with an axial recess to receive the other of said shaft gears in telescoped relation, and means for moving said shaft gears to and from telescoped relation and selective engagement with said axle gears, respectively.

13. In change speed gearing for motor vehicles, the combination with the vehicle propeller shaft and driving axles, of a pair of gears on the driving axles, and a pair of gears mounted on and movable toward and from each other axially of the propeller shaft for selective engagement with said axle gears, respectively, one of said shaft gears formed with an axial recess into which the other of said shaft gears is received with the said gears moved toward each other.

14. In change speed gearing, the combination with a longitudinally movable driving shaft, and a driven shaft disposed transversely thereof, of a pair of gears on the driven shaft, a pair of gears mounted on the driving shaft for movement axially thereof toward and from each other into selective engagement with said driven shaft gears, respectively, one of said shaft gears fixed to and movable with the shaft and the other of said gears movable independently of the shaft and formed with an axial recess to receive said other gear when the shaft gears are moved toward each other.

15. In change speed gearing, the combination with a longitudinally movable driving shaft, and a driven shaft disposed transversely thereof, of a pair of gears on the driven shaft, and a pair of gears on the driving shaft for movement axially thereof toward and from each other into selective engagement with said driven shaft gears, respectively, the outermost driving shaft gear fixed to and movable with said driving shaft, and the inner driving shaft gear of greater diameter than the outer gear and movable independently of the shaft, said inner gear formed with an axial recess facing the outer gear to receive the latter when the shaft gears are moved toward each other into one operative position thereof.

Signed at Bowman, North Dakota, this 17th day of December, 1923.

CARL A. ANDERSON.
ALFRED ANDERSON.